Oct. 10, 1961 D. HODKIN 3,003,784
PNEUMATIC LEVELLING SYSTEM FOR VEHICLES
Filed March 30, 1959 4 Sheets-Sheet 1

DAVID HODKIN
INVENTOR
by Irwin S. Thompson
ATTORNEY

Oct. 10, 1961   D. HODKIN   3,003,784
PNEUMATIC LEVELLING SYSTEM FOR VEHICLES
Filed March 30, 1959   4 Sheets-Sheet 2

INVENTOR
DAVID HODKIN
BY Irwin S. Thompson
ATTY.

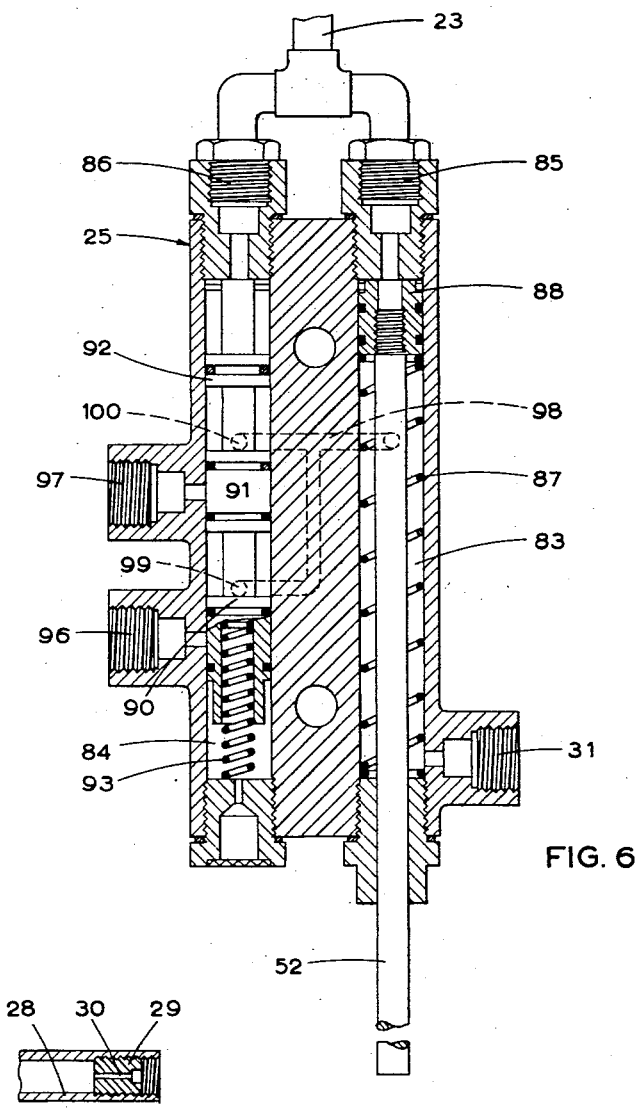

Oct. 10, 1961     D. HODKIN     3,003,784
PNEUMATIC LEVELLING SYSTEM FOR VEHICLES
Filed March 30, 1959     4 Sheets-Sheet 4

DAVID HODKIN
INVENTOR
by Irwin S. Thompson
ATTORNEY.

United States Patent Office 3,003,784
Patented Oct. 10, 1961

3,003,784
PNEUMATIC LEVELLING SYSTEM
FOR VEHICLES
David Hodkin, Lidlington, England, assignor to Engineering Research and Application Limited, Dunstable, England
Filed Mar. 30, 1959, Ser. No. 802,998
Claims priority, application Great Britain Apr. 3, 1958
5 Claims. (Cl. 280—124)

This invention relates to apparatus for effecting adjustment of the riding height of sprung parts or chassis of a vehicle in relation to the vehicle axles especially for adjusting the riding height of parts adjacent the wheels of the vehicle in relation to each other, commonly referred to as levelling. The invention is concerned with devices employing compressed air suspension devices in which changes of riding height are obtained by changing the mass of air (or ideally the product of the mass of air and the absolute temperature of the air) in each suspension device.

Objects of the invention are to simplify the construction of such means, to maintain correct pressures and to ensure that levelling can be effected and maintained without interference due to relative twisting between the axles and between the axles and body.

According to the present invention the apparatus comprises two air suspension devices associated with co-axial road wheels and connected selectively with an air reservoir and with an exhaust outlet by means of a levelling valve which determines the selection required according to the height of a sprung part of the vehicle in relation to a predetermined height, which valve seals said devices from exhaust and from the reservoir and from each other after levelling; the size of the reservoir and devices being such that the reservoir pressure can be maintained at least twice the pressure in said devices and the pressure in said devices can be maintained at least twice the atmospheric pressure; orifices being provided to restrict the flow of air to the said devices, whereby sonic velocity is ensured into and out of the said devices in order to throttle the air movement to ensure maintenance of a substantially constant product of air-mass and absolute air temperature in said devices.

The apparatus may include by-pass means including a pressure equalisation valve (or coupling valve) which by-passes the levelling valve and control means for opening the equalisation valve to open communication between said devices to effect pressure equalisation between these devices under certain conditions of the vehicle.

Preferably the equalisation valves are connected to and controlled by one or more roll-bars.

The invention will now be described by way of example with reference to the accompanying drawings wherein:

FIGURE 6 is a sectional view of a levelling valve;

FIGURE 7 is a sectional view of a detail to be described; and

Figure 1:
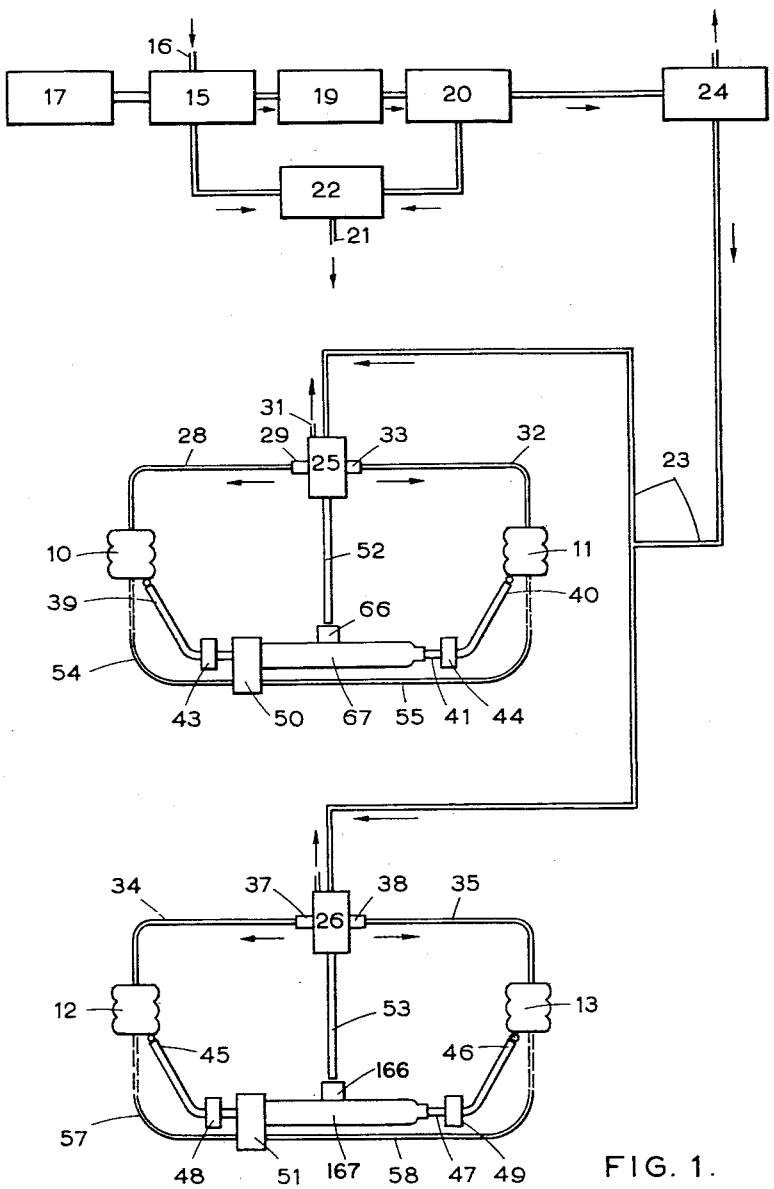
FIGURE 1 is a diagram of a vehicle levelling apparatus made in accordance with the invention as applied to a four-wheel motor road vehicle.

Referring first to FIGURE 1, four bellows suspension devices are provided, one adjacent each wheel, viz. front offside bellows 10, front nearside bellows 11, rear offside bellows 12, and rear nearside bellows 13.

An air compressor 15 having an air inlet 16 is driven from the engine 17 and supplies air under pressure through a filter 19 to a reservoir 20. The air in the reservoir is maintained at a pressure of at least twice the maximum pressure required in the bellows devices. The reservoir 20 and compressor 15 are connected for this purpose to an exhaust 21 through an adjustable blow-off valve 22 or an unloading valve permitting the compressor to run idly. The reservoir is connected through a level selecting valve 24 by pipe 23 to a front levelling valve 25 and a rear levelling valve 26, all these valves being mounted on suitable parts of the vehicle chassis. The valve 25 is connected to the bellows 10 by pipe 28 which contains a plug 29 having a small opening 30 therein (FIGURE 7). The valve 25 is also connected to the bellows 11 by a pipe 32 containing a similar plug 33. The valve 25 has an exhaust port 31.

The valve 26 is similarly connected to the rear bellows 12, 13 by pipes 34, 35 containing plugs 37, 38.

The front bellows 10, 11 are mounted adjacent the ends of arms 39, 40 of a front roll-bar 41. The roll-bar 41 is carried in bearings 43, 44 on the chassis and the ends of the arms 39, 40 remote from the roll-bar are fixed in relation to the vehicle front stub axles.

Similarly the rear bellows are associated with arms 45, 46 of a rear roll-bar 47 mounted in bearings 48, 49.

On the front roll-bar 41 there is mounted a cross-connecting valve or pressure equalising valve 50 and a similar cross-connecting valve 51 is mounted on the rear roll-bar 47.

The levelling valves 25, 26 have sensing rods 52, 53 which are moved out of the valve housings during travelling in order to contact the middle parts of the roll-bars thereby sensing the height of the rear and front of the chassis separately. Valve 50 is connected by pipes 54, 55 to the bellows devices 10, 11 and valve 51 is similarly connected by pipes 57, 58 to the bellows devices 12, 13.

The valve 24 is a three-way "level setting" valve, which can be driver-operated or by some other vehicle function denoting a suitable condition.

If due to change of operation condition the vehicle requires riding height correction, the driver operates the level setting valve (preferably when the vehicle is at rest or nearly at rest) or this can be effected by some other vehicle function, e.g. opening a door.

The front and rear levelling valves 25, 26 are now actuated, their sensing or follower rods 52, 53 coming into contact with roll-bar abutments 66, 166 and thus detecting the actual riding position of the vehicle. The levelling valves 25, 26 now allow either high pressure air to be fed to the two bellows units on the axle or allow air to escape to atmosphere, thus raising or lowering the mean riding height of their respective axle. If the vehicle is also assumed to be standing on uneven ground with relative twist between the front and rear tracks, the pressures in the two bellows units of either axle will be unequal. However, if the driver operates the valve the air is supplied to or escapes from each bellows unit via an orifice. The supply pressure is always at least twice the bellows pressure, and the bellows pressure is always at least twice atmospheric pressure, thus ensuring sonic air flow through the communicating orifice 30 during air flow into or out of the bellows unit; these sonic flow conditions ensuring the transfer of equal masses of air into or out of the bellows being fed from the same levelling valve. Thus although the two bellows devices will have unequal deflection and therefore be at different pressures if they initially contained equal masses of air, they will retain this equality though at the new riding height. This sonic velocity condition may not exactly maintain equivalent mass times absolute temperature relations in the two bellows for, in the event of one of the bellows being at a considerably higher temperature than the other, equal masses of air should not ideally be supplied to the two bellows as is produced by sonic throttling. However, the error is not large and the invention provides for cancelling this error at moment when the vehicle is running level. With the high pressure difference available for air supply and extraction, the levelling operation will take place in a short period of time, i.e. 3–5 seconds for a maximum height correction. At the completion of the levelling action, the bellows devices become individually sealed by the action of the valve, and when the level setting valve is released the levelling valve follower retracts and becomes inactive. The important operational feature here is that the individual bellows are only connected to a supply pressure or to atmosphere, whilst sonic velocity conditions appertain in the orifice 30 and no period is allowed for equalisation of pressures between the units, since the instant correct height has been achieved, immediate sealing of the bellows devices occurs. If the vehicle is now driven on to level ground after this height correction action has been completed, the bellows pressures on each axle will be the same although the front and rear pressures will differ according to the weight distribution front to rear of the loading condition. Thus, the vehicle will have no "diagonal" loading locked into the suspension, this being a prime requirement for a vehicle levelling system.

The action of the equalising valves 50, 51 is to join the two bellows units on a common axis so that pressure equalisation may take place at specific conditions of the vehicle. Their function may be considered to be that of correcting errors gradually accumulated by the actions described above. In the likelihood that the two supply orifices on one axle are not identical in size, or that the operating temperatures of these two bellows units differ, then a progressive pressure differential can be generated between these two units in the level road condition. To overcome this difficulty, the valves 50, 51 allow a pressure equalisation between bellows at moments when roll deflection of the particular axle is less than a predetermined small degree. This is achieved by sensing any twist in the roll bar 41 or 47 connecting the road wheels and using this to close the valve 50 or 51. The valve 50 or 51 is therefore closed by twists in either sense, but in order to reduce the life requirements of this valve, the action may be suitably damped so that it will only respond at a slow rate to movements of the sensing rod, thus eliminating continual fidget of the valve on normal road surface undulations. The effect of these valves is only to couple the bellows units on an axle when the vehicle is riding level in which condition the unit pressures should be identical. As soon as any roll action takes place due to cornering, road tilt, etc., a cross feed of air due to the build-up of pressure differential is prevented by closure of the valve 50 or 51. Certain tolerance is required in these valves to roll displacement, otherwise they would in fact never allow coupling between bellows to take place since true level riding conditions are only achieved instantaneously. Plus or minus one half inch on each road wheel is considered to be a suitable deflection at which the closure of the coupling valves commences.

Figure 2:
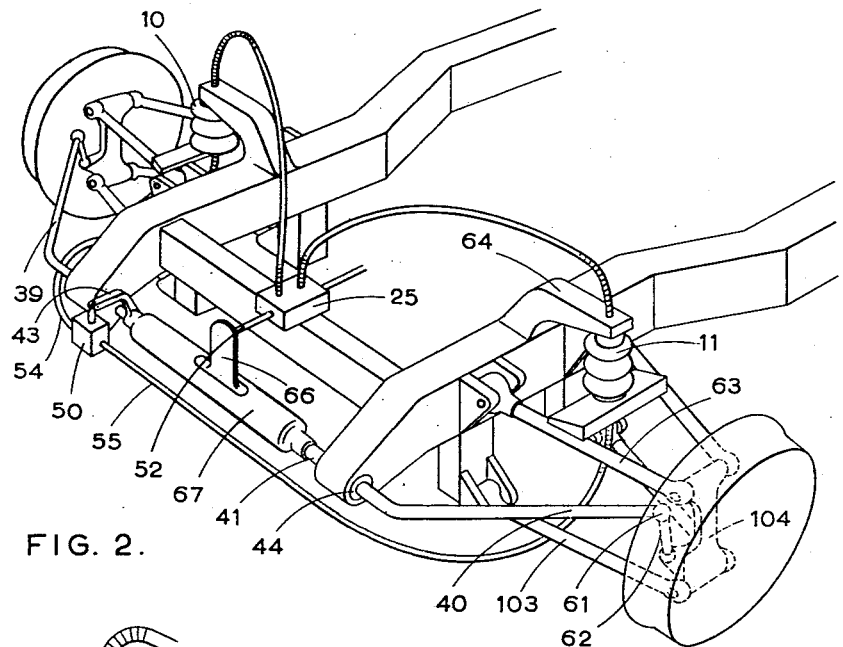
FIGURE 2 shows the front ends of the vehicle chassis members with roll-bar and associated parts in perspective.
Figure 3:
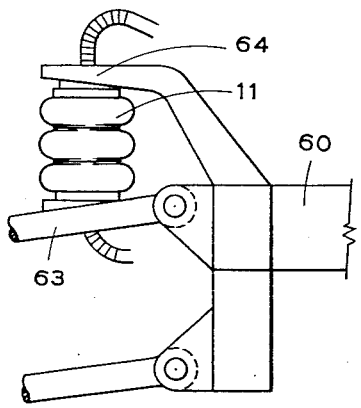
FIGURE 3 is a view of certain parts shown in FIGURE 2 but looking from the rear forwardly of the vehicle.
Figure 5:
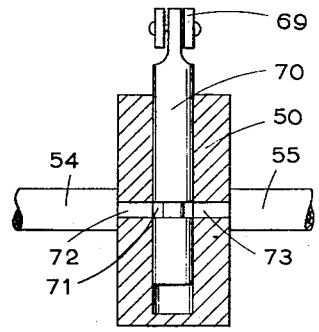
FIGURE 5 is a sectional view of an equalising valve.
Figure 4:
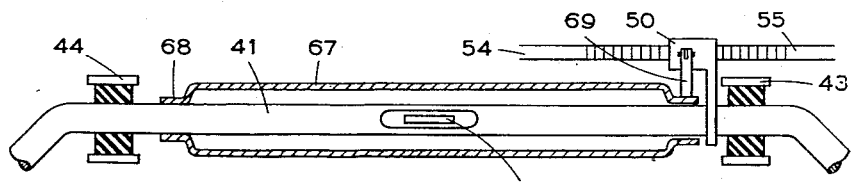
FIGURE 4 is a sectional view through the roll-bar.

FIGURES 2, 3 and 4 show details diagrammatically of the front roll-bar 41. This is mounted in bearings 43, 44 on the chassis members 60. The arm 40 is connected at 61 to a roll-bar link 62 which is connected to the lower wishbone 103 of the vehicle axle. The chassis carries wishbone links 63, 103, the outer ends of which carry the king post 104. The rubber bellows device 11 is disposed between the upper links 63 and an arm 64 fixed to the chassis. A similar construction is provided on the other side of the vehicle.

The levelling valve 25 is fixed on the chassis and its sensing rod 52 is adapted to contact an abutment 66 on the roll-bar 41.

Surrounding the roll-bar 41 is a sleeve 67 fixed at one end 68 to one end of the roll-bar and carrying a projection 69 adjacent the other end of the roll-bar. The projection 69 is pivotally connected to a plunger 70 constituting part of a valve, the other part being the valve body of the equalising valve 50 which is mounted on the roll-bar 41 adjacent the projection 69. The plunger 70 has a groove 71 therein which normally connects ports 72, 73 which in turn are connected to the pipes 54, 55. The rear roll bar has a similar sleeve 167 and associated parts.

A suitable form of levelling valve 25 is shown in FIGURE 6 by way of example. The valve body has two bores 83, 84 connected at 85, 86 to the air pressure supply pipe 23. The bore 83 contains the sensing rod 52 urged inwards by a spring 87 and having a piston head 88. The bore 84 contains a valve member having lands or piston heads 90, 91, 92 and urged towards 86 by a spring 93. The bore 84 has ports 96, 97 connected to the bellows 10, 11. A duct 98 connects the bore 83 to ports 99, 100 in the bore 84. When levelling is required pressure is applied at 23 which urges the valve 90, 91, 92 into a position in which the ports 99, 100 communicate with the ports 96, 97. The pressure also urges the rod 52 into contact with the abutment 66. If this positions the rod 52 with the head 88 covering the duct 98 no pressure will be supplied to the bellows devices nor will they be connected to exhaust. This will represent the required riding height. If the height is too low the head 88 will uncover the duct 98 and pressure from 85 will be fed via 98 to the ports 96, 97 until the head 88 closes the duct 98. If the height is too great the head 88 will remain on the side of duct 98 shown and the ports 96, 97 will be connected via 98 to the exhaust port 31 so that the bellows devices will be deflated until the head 88 is moved to close the duct 98.

Figure 8:
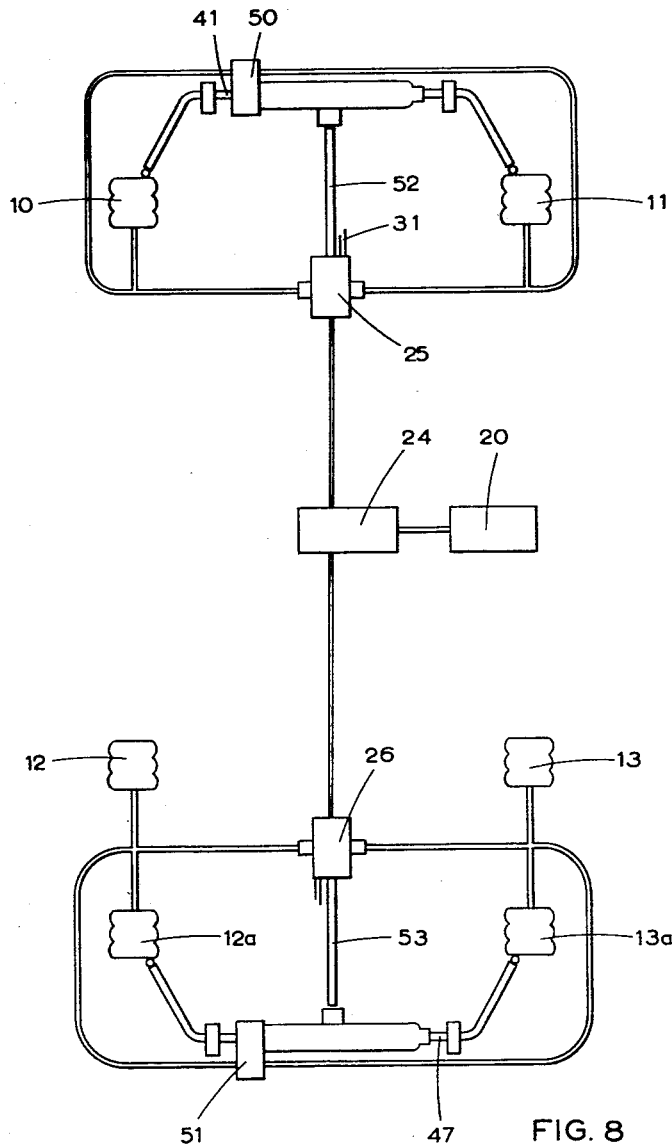
FIGURE 8 is a diagram of a levelling apparatus applied to a six-wheel 3-axle vehicle.

In applying the invention to a three-axle six-wheeled vehicle the front axle may have a pair of bellows devices as shown in FIGURE 8 supplied through the levelling valve 25 having a by-pass and equalising valve 50 therein. At the front rear axle is the levelling valve 26 connected to all four bellows devices 12, 12a, 13, 13a, of the two rear axles. A by-pass with equalising valve 51 extends between the two pairs of bellows devices on the two rear axles.

I claim:

1. A vehicle levelling apparatus comprising an air reservoir, two air suspension devices associated with coaxial road wheels, a levelling valve having an air exhaust outlet, said valve connecting the air suspension devices selectively to said air reservoir and said exhaust outlet according to the height of a sprung part of the vehicle in relation to a predetermined height, said valve sealing said devices from exhaust and from the reservoir and from each other after levelling; by-pass means connected with the air suspension devices and including a pressure equalisation valve which by-passes the levelling valve and is normally open to bring said devices into communication with each other; and control means for closing the equalisation valve to close communication between said devices when required; said control means including a roll bar, a member connected at one end to the roll-bar, a projection on the other end of said member, said equalisation valve comprising two relatively movable parts connected respectively to the other end of the roll-bar, and to said projection to close the equalisation valve when the roll-bar twists beyond a predetermined degree.

2. Apparatus as claimed in claim 1 wherein the said member is a sleeve surrounding the roll-bar.

3. A motor road vehicle for a six-wheeler three axle vehicle having air reservoir means, two left and two right rear air suspension devices, a levelling valve connecting the reservoir means with all said rear suspension devices, an equalisation valve connected between the left hand rear suspension devices and the right hand rear suspension devices, said valve being normally open to provide communication between the left hand and right hand suspension devices, means to connect the rear offside devices in constant communication with the other, and means to connect the rear nearside devices in constant communication with each other, a roll-bar, a member connected at one end to the roll-bar, a projection on the other end of said member, said equalisation valve comprising two relatively movable parts connected respectively to the other end of the roll-bar and to said projection, to close the equalisation valve when the roll-bar twists beyond a predetermined degree.

4. A vehicle levelling apparatus comprising an air reservoir, two air suspension devices associated with co-axial rear wheels, a levelling valve having an air exhaust outlet, said valve connecting the air suspension devices selectively to said air reservoir and said exhaust outlet according to the height of a sprung part of the vehicle in relation to a predetermined height, said valve sealing said devices from exhaust and from the reservoir and from each other after levelling; the size of the reservoir and devices being such that the reservoir pressure can be maintained at least twice the pressure in said devices and the pressure in said devices can be maintained at least twice the atmospheric pressure; orifices being provided to restrict the flow of air to the said devices to ensure maintenance of a substantially constant product of air-mass and absolute air temperatures in said devices; by-pass means connected with the air suspension devices and including a pressure equalisation valve which by-passes the levelling valve and is normally open to bring said devices into communication with each other; and control means for closing the equalisation valve to close communication between said devices when required; said control means including a roll bar, a member connected at one end to the roll-bar, a projection on the other end of said member, said equalisation valve comprising two relatively movable parts connected respectively to the other end of the roll-bar and to said projection to close the equalisation valve when the roll-bar twists beyond a predetermined degree.

5. A vehicle levelling apparatus comprising an air reservoir, two air suspension devices associated with co-axial road wheels, a levelling valve having an air exhaust outlet, said valve connecting the air suspension devices selectively to said air reservoir and said exhaust outlet according to the height of a sprung part of the vehicle in relation to a predetermined height, said valve sealing said devices from exhaust and from the reservoir and from each other after levelling; by-pass means connected with the air suspension devices and including a pressure equalisation valve which by-passes the levelling valve and is normally open to bring said devices into communication with each other; and control means for closing the equalisation valve to close communication between said devices when required; said control means including a roll bar, a member connected at one end to the roll-bar, a projection on the other end of said member, said equalisation valve comprising two relatively movable parts connected respectively to the other end of the roll-bar and to said projection to close the equalisation valve when the roll-bar twists beyond a predetermined degree; an abutment on said roll-bar, and a height sensing member carried by the levelling valve and engageable with said abutment for controlling the action of the levelling valve for opening and closing communication between the air suspension devices and said reservoir.

References Cited in the file of this patent
UNITED STATES PATENTS

| | | |
|---|---|---|
| 1,066,712 | Cooper | July 8, 1913 |
| 1,464,680 | Lassen | Aug. 14, 1923 |
| 2,691,420 | Fox | Oct. 12, 1954 |
| 2,787,475 | Jackson | Apr. 2, 1957 |
| 2,843,396 | Lucien | July 15, 1958 |
| 2,882,068 | Faiver | Apr. 14, 1959 |
| 2,918,304 | Jackson | Dec. 22, 1959 |